(12) United States Patent
Bachmaier et al.

(10) Patent No.: US 8,096,522 B2
(45) Date of Patent: Jan. 17, 2012

(54) PRESSURE REGULATOR FOR GASEOUS MEDIA

(75) Inventors: Georg Bachmaier, München (DE); Gerit Ebelsberger, München (DE); Matthias Gerlich, München (DE); Michael Höge, Haar (DE); Erhard Magori, Feldkirchen (DE); Randolf Mock, Hohenbrunn (DE); Harry Schüle, Neunburg V. Wald (DE); Stefan Treinies, Lappersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 623 days.

(21) Appl. No.: 12/297,773

(22) PCT Filed: Apr. 5, 2007

(86) PCT No.: PCT/EP2007/053373
§ 371 (c)(1),
(2), (4) Date: Oct. 20, 2008

(87) PCT Pub. No.: WO2007/122092
PCT Pub. Date: Nov. 1, 2007

(65) Prior Publication Data
US 2009/0065720 A1    Mar. 12, 2009

(30) Foreign Application Priority Data
Apr. 24, 2006 (DE) .................. 10 2006 019 404

(51) Int. Cl.
*F16K 31/12* (2006.01)
(52) U.S. Cl. .................. 251/30.02; 251/30.01

(58) Field of Classification Search ............... 251/30.01, 251/30.02
See application file for complete search history.

(56) References Cited

U.S. PATENT DOCUMENTS

| | | | | |
|---|---|---|---|---|
| 4,477,051 A * | 10/1984 | Ben-Yehuda | ............... | 251/30.01 |
| 5,632,465 A * | 5/1997 | Cordua | ............... | 251/46 |
| 5,771,857 A | 6/1998 | Willi | ............... | 123/305 |
| 6,003,543 A | 12/1999 | Sulatisky et al. | ............... | 137/487.5 |
| 6,877,714 B2 * | 4/2005 | Hall | ............... | 251/45 |
| 6,932,278 B2 * | 8/2005 | Reiter et al. | ............... | 239/102.2 |
| 6,945,507 B2 * | 9/2005 | Baarda et al. | ............... | 251/25 |

FOREIGN PATENT DOCUMENTS

| | | |
|---|---|---|
| DE | 19524413 | 7/1995 |
| EP | 0379759 | 1/1989 |
| EP | 1058060 | 10/1999 |
| WO | 00/00732 | 1/2000 |
| WO | 03/064928 | 8/2003 |

* cited by examiner

*Primary Examiner* — John Fristoe, Jr.
(74) *Attorney, Agent, or Firm* — King & Spalding L.L.P.

(57) ABSTRACT

A pressure regulator can be used particularly in a CNG-operated motor vehicle as an electronically controlled pressure reducer for maintaining the gas pressure constant on the injection valve used for filling the respective cylinder. The pressure regulator is composed of a control unit (1), a pressure reducer (3) that is controlled by the control unit (1), and a throttle (2) which connects the gas outlets (20, 40) of the working chamber (17) of the control unit (1) and the pressure reducer (3). A piezoelectric actuator (11) which affects the valve (21, 22) of an overflow device (14) makes it possible to specifically modify the gas pressure (P2) in the working chamber (17) of the control unit (1) and simultaneously influence the position of the valve (38, 39) of the overflow device (33) of the pressure reducer (3), thus allowing the output pressure (Pout) of the pressure reducer (3) to be adjusted to a predefined desired value.

20 Claims, 2 Drawing Sheets

PRESSURE REGULATOR FOR GASEOUS MEDIA

CROSS-REFERENCE TO RELATED APPLICATIONS

This application is a U.S. National Stage Application of International Application No. PCT/EP2007/053373 filed Apr. 5, 2007, which designates the United States of America, and claims priority to German Application No. 10 2006 019 404.7 filed Apr. 24, 2006, the contents of which are hereby incorporated by reference in their entirety.

TECHNICAL FIELD

The present invention concerns a pressure regulator for gaseous media.

BACKGROUND

Natural gas in particular comes into consideration as an environmentally acceptable and affordable alternative to diesel or gasoline fuel. In order to be able to carry the natural gas serving as fuel in sufficient quantity in a motor vehicle, the gas is compressed to approximately 10-200 bar, depending on gas quantity and temperature, and stored in a pressurized tank. The storage pressure is thus considerably higher than the operating pressure of the injection valves filling each of the cylinders of the engine. The fuel supply of a motor vehicle powered by Compressed Natural Gas (CNG) is therefore equipped with a pressure reducer or pressure regulator, as known for example from DE 195 24 413, U.S. Pat. No. 5,771,857 or U.S. Pat. No. 6,003,543, which is disposed between the gas reservoir and the injection valve and which lowers the storage pressure amounting to up to 200 bar to a preset value of typically 8 bar.

If a very great amount of natural gas flows into the cylinders of the combustion engine due to an abrupt change in load, the pressure in the supply line supplying the injection valve with natural gas temporarily drops below the desired setpoint pressure, since the pressure regulator reacts to this drop in pressure only after a time delay. This response has a disadvantageous effect on the desired driving dynamics of the motor vehicle. Efforts are therefore made to keep the location of the gas line between the pressure reducer/regulator and the assigned injection valve as small as possible. In practice, however, this can only be realized to a limited extent since the installation of the pressure reducer/regulator in proximity to the injection valve poses considerable design engineering problems. In addition, the squeezing together of the two components leads to a corresponding lengthening of the storage-side, high-pressure-resistant and consequently comparatively expensive gas line.

SUMMARY

A pressure regulator for gaseous media can be provided whose output-side pressure level can be varied comparatively quickly over a wide range or can be set to a predefined value.

According to an embodiment, a pressure regulator for gaseous media may comprise a control unit and a pressure reducer controlled by the control unit, a first housing chamber of the control unit which is connected to a storage unit and to a second housing chamber of the control unit via a first overflow device with a variable cross-section, the storage unit containing a pressurized gaseous medium, —a first housing chamber of the pressure reducer connected to the storage unit and a second overflow device with a variable cross-section connected to a second housing chamber of the pressure reducer,—a gas outlet of the second housing chamber of the pressure reducer leading indirectly or directly into a gas line,—a third housing chamber of the pressure reducer fluidically connected to a gas outlet of the second housing chamber of the control unit, and a throttle unit connected to the gas outlet of the second housing chamber of the control unit on the gas inlet side and to the gas line on the gas outlet side.

According to a further embodiment, the housing chambers of the control unit may have a common first partition provided with a first gas through-opening and a first closing element sealing off the first gas through-opening in a non-operated position is guided in a displaceable manner relative to the first gas through-opening. According to a further embodiment, the first closing element may be secured to an outer wall of the second housing chamber of the control unit, and the outer wall may be guided in an axially displaceable manner. According to a further embodiment, the pressure regulator may comprise an electromechanical transducer displacing the first closing element or the outer wall of the second housing chamber in the axial direction. According to a further embodiment, the pressure regulator may comprise a piezoelectric, magnetorestrictive or electrostrictive transducer. According to a further embodiment, the first and second housing chambers of the pressure reducer may have a common second partition provided with a second gas through-opening and that a second closing element sealing off the second gas through-opening in a non-operated position is guided in a displaceable manner relative to the second gas through-opening. According to a further embodiment, the second closing element may be secured to a partition which is common to the second and third housing chambers of the pressure reducer and may be guided in an axially displaceable manner. According to a further embodiment, the housing chambers of at least one of the control unit and the pressure reducer may be in each case embodied cylindrically and the outer wall of the second housing chamber of at least one of the control unit and the common partition of the second and third housing chambers of the pressure reducer have the form of a piston. According to a further embodiment, at least one of the first and second gas through-opening can be embodied as a seal seat and that at least one of the first and second closing element may have a disk-shaped, cone-shaped or tapered valve.

BRIEF DESCRIPTION OF THE DRAWINGS

The invention is explained in more detail with reference to drawings, in which.

DETAILED DESCRIPTION

The pressure regulator according to various embodiments can be used in particular in a CNG-powered vehicle as an electronically controllable pressure reducer for maintaining the system pressure at the injection valve constant or, in conjunction with a motor-actuated nozzle or injection valve, be used as an electronically controlled metering unit for gaseous media. It is therefore possible to realize the function of the pressure regulator and that of the injection valve in a single, compactly designed unit controlled by the engine controller.

According to various embodiments, the pressure at the output of the pressure reducer or, as the case may be, a mass flow can be controllably varied since the control unit effecting the change in state contains, as its final control element, an electromechanical transducer that responds very quickly to electrical signals and is controlled for example by an engine controller.

The Structure of the Pressure Regulator

Figure 1:
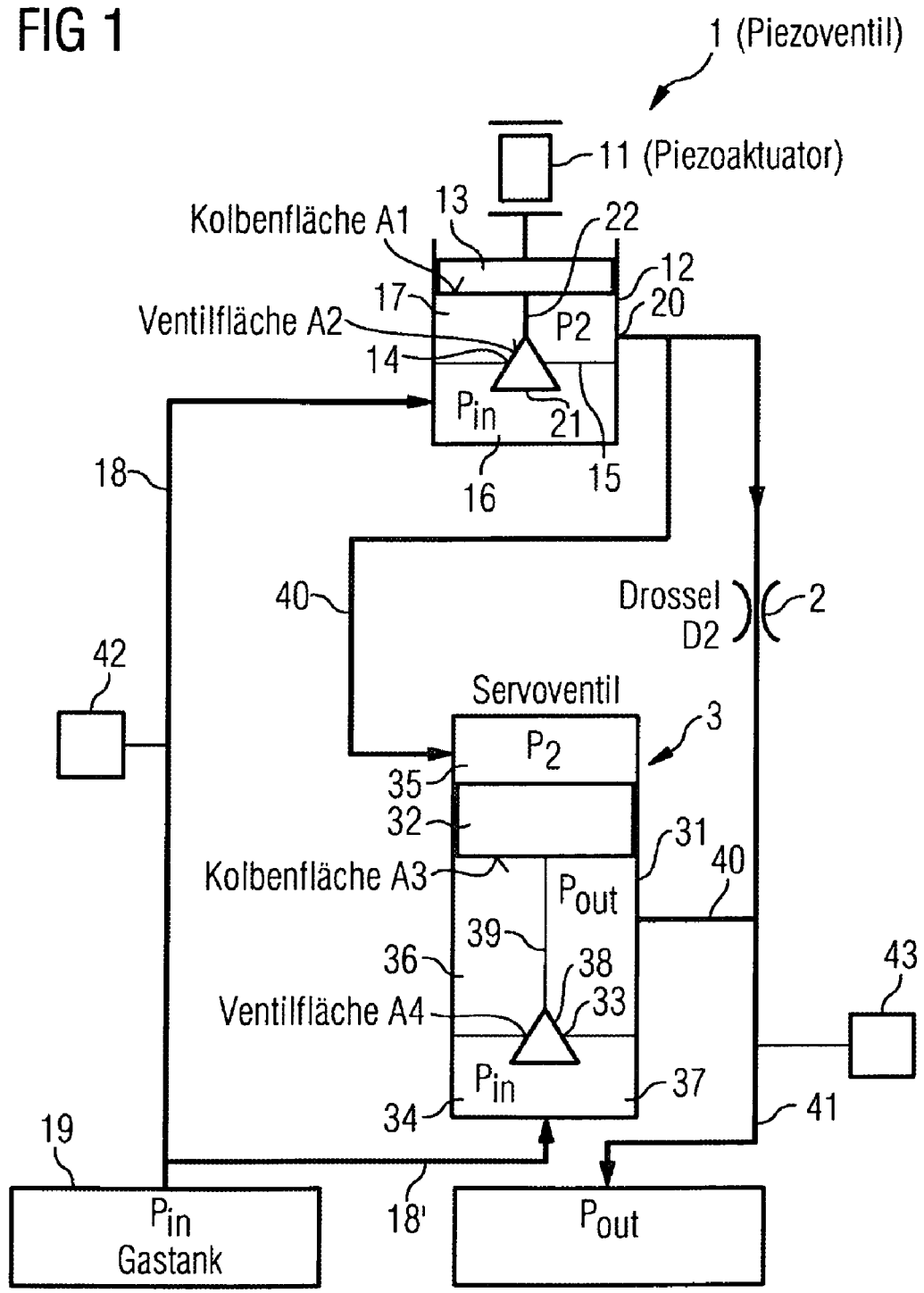
FIG. 1 shows the schematic structure of a pressure regulator according to an embodiment for a CNG-powered combustion engine.

The control unit 1 of the pressure regulator, depicted merely schematically in FIG. 1, for a CNG-powered combustion engine is equipped with an electromechanical transducer 11 controlled by the engine controller (not shown) as its final control element. A piezoelectric actuator in particular proves suitable as an electromechanical transducer 11 since its length can be very quickly changed in a defined and reproducible manner by application of an electric voltage. The electromechanical transducer 11 acts on a piston 13 which is mounted so as to be axially displaceable in a cylindrical housing 12 and which simultaneously closes off the housing 12 of the control unit 1 in a gas-tight manner on the transducer side. A partition 15 which is provided with an in particular circular through-opening 14 subdivides the housing 12 of the control unit 1 into two cylindrical chambers 16/17, with the storage pressure $P_{in}$=200-250 bar prevailing in the lower chamber 16 connected via a high-pressure-resistant supply line 18 to the natural gas reservoir 19, while a lower pressure $P2 \leq P_{in}$ is present at the gas outlet 20 of the upper housing chamber 17.

In the non-operated state (piezoelectric actuator 11 discharged or not activated) the tapered, cone- or disk-shaped head 21, serving as a valve, of the tappet 22 connected to the piston 13 closes the through-opening 14, embodied as a seal seat, of the partition 15, with the result that no natural gas can flow from the lower housing chamber 16 into the upper housing chamber 17, which is designated in the following as the working chamber. The tappet head 21 serving as a valve remains in this position even if the piezoelectric actuator 11 fails due to a fault or if it should no longer be controllable for other reasons. This behavior ensures that the pressure regulator remains closed ("normally off") for safety reasons in the event of a malfunction.

In the state shown in FIG. 1, the force $F_p = P_{in} \times A2 + P2 \times (A1-A2)$ is exerted onto the piston 13 and hence also onto the piezoelectric actuator 11, where $P_{in}$ and P2 designate the aforementioned chamber pressures, A1 the tappet-side surface of the piston 13, and A2 the surface of the tappet head 21 on which the pressure is effective. Thus, the tappet head 21 lifts off from its seal seat and reveals the through-opening 14 only when the piezoelectric body's change in length enforced by active charging of the piezoelectric actuator 11 exerts a force satisfying one of the conditions $F_{piezo} > F_p$ on the piston 13 and the piston 13 and the tappet 22 fixed thereto move downward in the axial direction.

The cylindrical housing 31 of the pressure reducer 3 controlled by the control unit 1 is subdivided into three chambers 35-37 by means of a piston 32 that is guided in a displaceable manner in the axial direction (valve-side surface A3) and a partition 34 that is again provided with, for example, a circular through-opening 33. Depending on the position within the housing 31 of the piston 32 closing off the upper chamber 35 in a gas-tight manner, the tapered, cone- or disk-shaped head 38 serving as a valve (pressure-effective surface A4) of the tappet 39 connected to the piston 32 reveals the through-opening 33 of the partition 34 to a greater or lesser degree or completely seals it off. Because the upper housing chamber 35 of the pressure reducer 3 is fluidically connected via a supply line 40 to the working chamber 17 of the control unit 1, the pressure P2 also obtains there. The lower housing chamber 37 of the pressure reducer 3 is filled with natural gas by the storage unit 19 via a branch 18' of the supply line 18 and the chamber pressure is in this way maintained constant at $P_{in}$.

A gas pressure $P_{out}$ establishes itself in the middle housing chamber 36. Said pressure $P_{out}$ also obtains in the gas line 41 which is connected to the gas outlet 40 of the middle housing chamber 36 and which is directly connected to the respective injection valve or leads into what is termed a gas manifold.

A throttle 2 (cross-sectional area D2) connects the working chamber 17 of the control unit 1 to the middle housing chamber 36 of the pressure reducer 3 or gas line 41.

The two sensors 42/43 measure the storage pressure $P_{in}$ and the pressure P2 at the gas outlet 40 of the middle housing chamber 36 and report the respective measured values to the engine controller so that the latter can control the piezoelectric actuator accordingly and adjust the pressure P2 or set it to a predefined setpoint value.

The Mode of Operation of the Pressure Regulator

As a result of being charged the piezoelectric actuator 11 stretches and causes the piston 13 in the housing 12 of the control unit 1 to be moved downward. This movement is followed by the tappet 22 which is mechanically rigidly connected to the piston 13, such that the tappet's head 21 embodied as a valve lifts off from the seal seat and reveals the through-opening 14. Natural gas can now flow from the lower housing chamber 16 into the working chamber 17, with the result that the gas pressure P2 increases both in the working chamber 17 and in the upper housing chamber 35 of the pressure reducer 3 connected to the working chamber 17. If the gas pressure P2 in the housing chamber 35 exceeds a threshold value that is dependent on the storage pressure $P_{in}$ and the surfaces A3 and A4 of the piston 32 or the tappet head 38, the piston 32 and the tappet 39 mechanically rigidly connected thereto, together with valve 38, move downward. Natural gas can accordingly flow into the middle housing chamber 36 and via its outlet 40 into the gas line 41. Said gas flow is further reinforced by a configuration-induced smaller gas flow which discharges from the working chamber 17 of the control unit 1 via the throttle 2. The injection process starts when the pressure $P_{out}$ dependent on the surfaces A1, A2, D2, A3 and A4 reaches the setpoint value and the engine controller opens the injection valve.

When the piezoelectric actuator 11 is discharged, the piston 13 of the control unit 1 is pushed upward back into its starting position due to the pressure conditions then obtaining, with the result that the valve 21 prevents the natural gas from overflowing from the lower housing chamber 16 into the working chamber 17. The dynamics of this closing operation are in this case dependent on the size of the throttle diameter D2. Along with the pressure P2 in the working chamber 17, the pressure in the upper housing chamber 35 of the pressure reducer 3 also drops correspondingly and the valve 38 closes. The injection process is thus terminated.

The Gas Supply of the Combustion Engine

Figure 2:
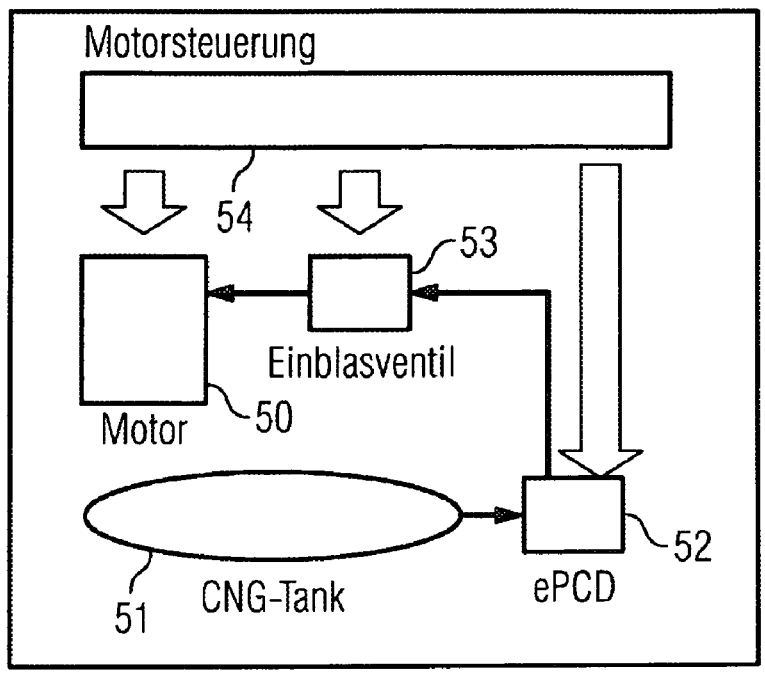
FIGS. 2 and 3: show two variants of the gas supply for a CNG-powered combustion engine.

As shown schematically in FIG. 2, the gas supply of each of the cylinders of the combustion engine 50 consists for example of a pressure regulator 52 according to FIG. 1 that is fed from the CNG storage tank 51 and an electromagnetically actuated injection valve 53. Additionally required isolation valves and temperature and pressure sensors are not shown. In addition to the various engine components, an engine controller 54 controls both the injection valve 53 and the pressure regulator 52 or its piezoelectric actuator. Since the engine controller 54 knows all the parameters determining the engine power and hence also the injection process, it is also able to calculate in advance (time T) the pressure changes occurring at the injection valve 53 assigned to the respective cylinder during a change in load and compensate by means of prior (time T':=T−dT) adjustment of the gas pressure P2 at the engine-side output of the pressure reducer 52.

Figure 3:
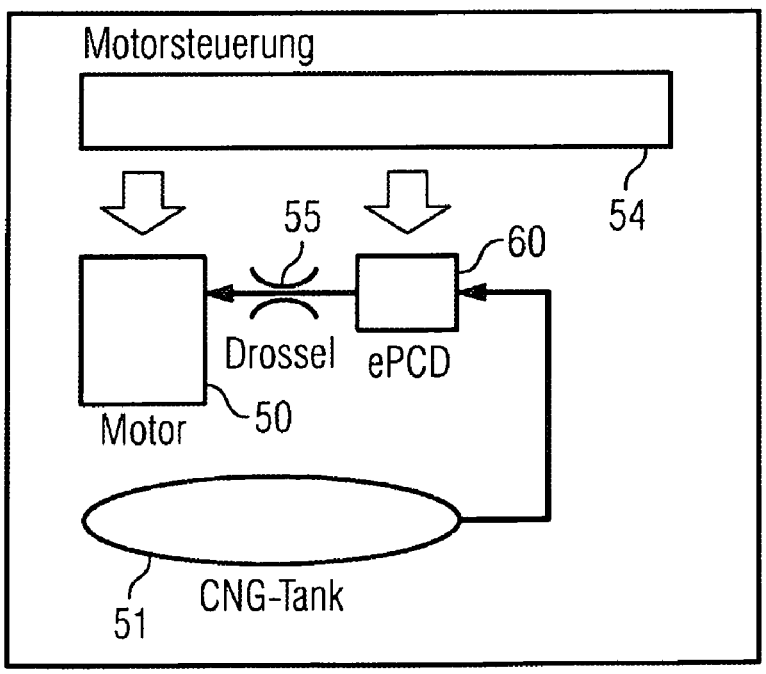

The gas supply of the combustion engine can be considerably simplified by dispensing with the separate filling of the individual cylinders. The natural gas is therefore no longer injected into the intake pipe of the respective cylinder, in other words injected separately, but is admixed with the aspirated air already in the plenum of the intake manifold. In a system of this kind, as shown schematically in FIG. 3, only a single metering unit 60 is now used, said metering unit 60 consisting of the above-described pressure regulator and a nozzle fed by the pressure regulator and actuated by means of stepper or servo motors. By means of this unit which combines the functions of the pressure regulator and those of the injection valve, a controllable mass flow can be generated under the control of the engine controller 54 and supplied to the engine via a throttle 55.

The invention claimed is:

1. A pressure regulator for gaseous media comprising a control unit and a pressure reducer controlled by the control unit,
    a first housing chamber of the control unit having an input which is connected to a storage unit, wherein the first housing chamber is further connected to a second housing chamber of the control unit via a first overflow device with a variable cross-section, and wherein the storage unit containing a pressurized gaseous medium,
    a first housing chamber of the pressure reducer having an input connected to the storage unit, wherein the first housing chamber of the pressure reduce is further connected to a second overflow device with a variable cross-section connected to a second housing chamber of the pressure reducer,
    a gas outlet of the second housing chamber of the pressure reducer leading indirectly or directly into a gas line,
    a third housing chamber of the pressure reducer fluidically connected to a gas outlet of the second housing chamber of the control unit, wherein an outlet pressure of the control unit operates on a pressure sensitive area within the third housing chamber which is mechanically coupled with a closing element of the second overflow device, and
    a throttle unit connected to the gas outlet of the second housing chamber of the control unit on the gas inlet side and to the gas line on the gas outlet side.

2. The pressure regulator according to claim 1, wherein the housing chambers of the control unit have a common first partition provided with a first gas through-opening and a first closing element sealing off the first gas through-opening in a non-operated position is guided in a displaceable manner relative to the first gas through-opening.

3. The pressure regulator according to claim 2, wherein the first closing element is secured to an outer wall of the second housing chamber of the control unit, said outer wall being guided in an axially displaceable manner.

4. The pressure regulator according to claim 1, comprising an electromechanical transducer displacing the first closing element or the outer wall of the second housing chamber in the axial direction.

5. The pressure regulator according to claim 4, comprising a piezoelectric, magnetorestrictive or electrostrictive transducer.

6. The pressure regulator according to claim 1, wherein the first and second housing chambers of the pressure reducer have a common second partition provided with a second gas through-opening and that a second closing element sealing off the second gas through-opening in a non-operated position is guided in a displaceable manner relative to the second gas through-opening.

7. The pressure regulator according to claim 6, wherein the second closing element is secured to a partition which is common to the second and third housing chambers of the pressure reducer and is guided in an axially displaceable manner.

8. The pressure regulator according to claim 1, wherein the housing chambers of at least one of the control unit and the pressure reducer are in each case embodied cylindrically and the outer wall of the second housing chamber of at least one of the control unit and the common partition of the second and third housing chambers of the pressure reducer have the form of a piston.

9. The pressure regulator according to claim 1, wherein at least one of the first and second gas through-opening are/is embodied as a seal seat and that at least one of the first and second closing element have/has a disk-shaped, cone-shaped or tapered valve.

10. A pressure regulator for gaseous media comprising:
    a control unit comprising a first housing chamber having an input which is connected to a storage unit and comprising a second housing chamber being connected to the first housing chamber via a first overflow device with a variable cross-section, wherein the storage unit contains a pressurized gaseous medium,
    a pressure reducer, controlled by the control unit, comprising third and fourth housing chambers, wherein the third housing chamber comprises an input which is connected to the storage unit and a second overflow device with a variable cross-section connected to the fourth housing chamber,
    a gas outlet of the fourth housing chamber leading indirectly or directly into a gas line,
    wherein the pressure reducer comprises a fifth housing chamber fluidically connected to a gas outlet of the second housing chamber, and
    a throttle unit connected to the gas outlet of the second housing chamber of the control unit on the gas inlet side and to the gas line on the gas outlet side.

11. The pressure regulator according to claim 10, wherein the first and second housing chambers have a common first partition provided with a first gas through-opening and a first closing element sealing off the first gas through-opening in a non-operated position is guided in a displaceable manner relative to the first gas through-opening.

12. The pressure regulator according to claim 11, wherein the first closing element is secured to an outer wall of the second housing chamber, said outer wall being guided in an axially displaceable manner.

13. The pressure regulator according to claim 10, comprising an electromechanical transducer displacing the first closing element or the outer wall of the second housing chamber in the axial direction.

14. The pressure regulator according to claim 13, comprising a piezoelectric, magnetorestrictive or electrostrictive transducer.

15. The pressure regulator according to claim 10, wherein the third and fourth housing chambers have a common second partition provided with a second gas through-opening and that a second closing element sealing off the second gas through-opening in a non-operated position is guided in a displaceable manner relative to the second gas through-opening.

16. The pressure regulator according to claim 15, wherein the second closing element is secured to a partition which is common to the fourth and fifth housing chambers and is guided in an axially displaceable manner.

17. The pressure regulator according to claim 10, wherein the housing chambers of at least one of the control unit and the pressure reducer are in each case embodied cylindrically and the outer wall of at least the second housing chamber and the common partition of the fourth and fifth housing chambers have the form of a piston.

18. The pressure regulator according to claim 10, wherein at least one of the first and second gas through-opening are/is embodied as a seal seat and that at least one of the first and second closing element have/has a disk-shaped, cone-shaped or tapered valve.

19. A pressure regulator for gaseous media comprising a control unit and a pressure reducer controlled by the control unit,
- a first housing chamber of the control unit which is connected to a storage unit and to a second housing chamber of the control unit via a first overflow device with a variable cross-section, the storage unit containing a pressurized gaseous medium,
- a first housing chamber of the pressure reducer connected to the storage unit and a second overflow device with a variable cross-section connected to a second housing chamber of the pressure reducer,
- a gas outlet of the second housing chamber of the pressure reducer leading indirectly or directly into a gas line,
- a third housing chamber of the pressure reducer fluidically connected to a gas outlet of the second housing chamber of the control unit, and
- a throttle unit connected to the gas outlet of the second housing chamber of the control unit on the gas inlet side and to the gas line on the gas outlet side,
- wherein the housing chambers of the control unit have a common first partition provided with a first gas through-opening and a first closing element sealing off the first gas through-opening in a non-operated position is guided in a displaceable manner relative to the first gas through-opening and wherein the first closing element is secured to an outer wall of the second housing chamber of the control unit, said outer wall being guided in an axially displaceable manner.

20. The pressure regulator according to claim 19, comprising an electromechanical transducer displacing the first closing element or the outer wall of the second housing chamber in the axial direction.

* * * * *